(12) United States Patent
Kato

(10) Patent No.: US 9,972,099 B2
(45) Date of Patent: May 15, 2018

(54) OPERATION ASSISTANCE DEVICE AND OPERATION ASSISTANCE METHOD

(71) Applicant: FUJITSU LIMITED, Kawasaki-shi, Kanagawa (JP)

(72) Inventor: Junya Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 15/370,018

(22) Filed: Dec. 6, 2016

(65) Prior Publication Data

US 2017/0228889 A1    Aug. 10, 2017

(30) Foreign Application Priority Data

Feb. 5, 2016   (JP) .................................. 2016-021068

(51) Int. Cl.
| G06K 9/46 | (2006.01) |
| G06K 9/66 | (2006.01) |
| G06T 7/73 | (2017.01) |
| G06T 7/00 | (2017.01) |

(52) U.S. Cl.
CPC ................ G06T 7/73 (2017.01); G06T 7/001 (2013.01); *G06T 2207/10004* (2013.01); *G06T 2207/30141* (2013.01)

(58) Field of Classification Search
CPC . G06T 7/73; G06T 7/001; G06T 2207/30141; G06T 2207/10004
See application file for complete search history.

(56) References Cited

U.S. PATENT DOCUMENTS

| 3,544,838 | A | * | 12/1970 | Carruth | ................. | B60Q 9/001 |
| | | | | | | 315/77 |
| 5,557,633 | A | * | 9/1996 | Staab | ................. | G01R 29/0273 |
| | | | | | | 370/246 |
| 5,823,790 | A | * | 10/1998 | Magnuson | ............. | H01R 24/50 |
| | | | | | | 333/260 |
| 7,375,532 | B1 | * | 5/2008 | Lo | ............................ | H04B 3/46 |
| | | | | | | 324/533 |

(Continued)

FOREIGN PATENT DOCUMENTS

| JP | 9-282485 | 10/1997 |
| JP | 2007-005358 | 1/2007 |

(Continued)

*Primary Examiner* — Samir Ahmed
(74) *Attorney, Agent, or Firm* — Fujitsu Patent Center

(57) ABSTRACT

An operation assistance device includes a processor that executes a procedure. The procedure includes acquiring an operation image captured at each unit of operation in a linking operation to link a plurality of devices together, identifying positions, in the acquired operation image, of connection portions respectively provided at the plurality of devices, based on marker information included in the operation image, and based on design information of the plurality of devices, the design information including position information and a linkage state of the connection portions, executing image analysis processing on the identified positions of the connection portions to determine state of each connections made at each of the units of operation, based on a result of comparing a design image generated based on the design information and the operation image, and outputting information indicating a determination result to a display section.

12 Claims, 21 Drawing Sheets

(56) References Cited

U.S. PATENT DOCUMENTS

| | | | | |
|---|---|---|---|---|
| 9,018,958 | B2* | 4/2015 | Bertness | G01R 31/006 324/500 |
| 2002/0046375 | A1* | 4/2002 | Haroun | G01R 31/318536 714/727 |
| 2010/0077365 | A1* | 3/2010 | Shulmister, Jr. | H04L 43/50 716/106 |
| 2012/0035870 | A1* | 2/2012 | Bertness | G01R 31/006 702/59 |

FOREIGN PATENT DOCUMENTS

| | | |
|---|---|---|
| JP | 2009-279193 | 12/2009 |
| JP | 2012-152016 | 8/2012 |

\* cited by examiner

FIG.3

| COMPONENT | | DIMENSIONS | MOUNTING POSITION | CONNECTED PORT | CONNECTION FLAG |
|---|---|---|---|---|---|
| BOARD 10 | | x, y, z | X, Y, Z | - | - |
| MARKER M | | xM, yM | - | - | - |
| DEVICE 12 | | xA, yA, zA | XA, YA, ZA | - | - |
| | PORT 12A | xA1, yA1, zA1 | XA1, YA1, ZA1 | PORT 14B | 0 |
| | PORT 12B | xA2, yA2, zA2 | XA2, YA2, ZA2 | PORT 14A | 1 |
| | PORT 12C | xA3, yA3, zA3 | XA3, YA3, ZA3 | PORT 14C | 0 |
| DEVICE 14 | | xB, yB, zB | XB, YB, ZB | - | - |
| | PORT 14A | xB1, yB1, zB1 | XB1, YB1, ZB1 | PORT 12B | 1 |
| | PORT 14B | xB2, yB2, zB2 | XB2, YB2, ZB2 | PORT 12A | 0 |
| | PORT 14C | xB3, yB3, zB3 | XB3, YB3, ZB3 | PORT 12C | 0 |
| DEVICE 16 | | xC, yC, zC | XC, YC, ZC | - | - |
| | ... | ... | ... | ... | ... |

| ITEM NAME | | VALUE |
|---|---|---|
| BASIC INFORMATION | CATEGORY | AR MARKER |
| | MARKER ID | 1 |
| TEXT INFORMATION | TEXT | CONNECT THE TWO PORTS IN THE RED BOXES USING A CABLE |
| | FONT SIZE | 10 |
| | FONT COLOR | #000000 |
| PLACEMENT INFORMATION | PROJECTION METHOD | 2D |

34B

| ITEM NAME | | VALUE |
|---|---|---|
| BASIC INFORMATION | CATEGORY | AR MARKER |
| | MARKER ID | 2 |
| GRAPHIC INFORMATION | SELECTION GRAPHIC | ▢ |
| PLACEMENT INFORMATION | PROJECTION METHOD | 2D |

| ITEM NAME | | VALUE |
|---|---|---|
| BASIC INFORMATION | CATEGORY | AR MARKER |
| | MARKER ID | 1 |
| TEXT INFORMATION | TEXT | CONNECT THE TWO PORTS IN THE RED BOXES USING A CABLE |
| | FONT SIZE | 10 |
| | FONT COLOR | #000000 |
| PLACEMENT INFORMATION | PROJECTION METHOD | 2D |
| | COORDINATE POSITION | X | 1.5 |
| | | Y | 5.0 |
| | | Z | 0.0 |
| | ROTATIONAL ANGLE | X | 0.0 |
| | | Y | 0.0 |
| | | Z | 0.0 |
| | SCALE | X | 0.0 |
| | | Y | 0.0 |
| | | Z | 0.0 |

34B

| ITEM NAME | | VALUE |
|---|---|---|
| BASIC INFORMATION | CATEGORY | AR MARKER |
| | MARKER ID | 2 |
| GRAPHIC INFORMATION | SELECTION GRAPHIC | ▢ |
| PLACEMENT INFORMATION | PROJECTION METHOD | 2D |
| | COORDINATE POSITION | X | 1.5 |
| | | Y | 5.0 |
| | | Z | 0.0 |
| | ROTATIONAL POSITION | X | 0.0 |
| | | Y | 0.0 |
| | | Z | 0.0 |
| | SCALE | X | 0.0 |
| | | Y | 0.0 |
| | | Z | 0.0 |

OPERATION ASSISTANCE DEVICE AND OPERATION ASSISTANCE METHOD

CROSS-REFERENCE TO RELATED APPLICATION

This application is based upon and claims the benefit of priority of the prior Japanese Patent Application No. 2016-021068, filed on Feb. 5, 2016, the entire contents of which are incorporated herein by reference.

FIELD

The embodiments discussed herein are related to a storage medium storing an operation assistance program, an operation assistance device, and an operation assistance method.

BACKGROUND

Technology has been proposed for assisting operations to test whether or not a linkage state of a cable that interconnects devices mounted to a board is correct.

For example, technology has been proposed that displays, on a display device, a composite image that is a composite of a design image produced from a design graphic of the board or the like, and a real image capturing the board in a state in which all of the cables have been linked up (namely, all wiring operations are completed). In such technology, an operator determines whether or not the cable linkage state is correct by checking the composite image displayed on the display device by eye.

Technology is also known that, for example, respectively allocates identification numbers to a connector of a cable at a connection source and to a port at a connection target, and pre-assigns an association therebetween. In such technology, the respective identification numbers of the connector of the cable at the connection source and the port at the connection target are captured after linking. Then, in the technology, whether or not the linkage state of the cables is correct is determined according to whether or not each of the identification numbers obtained by capturing has been pre-associated.

RELATED PATENT DOCUMENTS

Japanese Laid-Open Patent Publication No. 2007-005358
Japanese Laid-Open Patent Publication No. 2012-152016

SUMMARY

According to an aspect of the embodiments, a non-transitory recording medium stores an operation assistance program that is executable to cause a computer to perform a process. The process includes, acquiring an operation image captured at each unit of operation in a linking operation to link plural devices together, identifying positions, in the acquired operation image, of connection portions respectively provided at the plural devices, based on marker information included in the operation image, and based on design information of the plural devices, the design information including position information and a linkage state of the connection portions, executing image analysis processing on the identified positions of the connection portions to determine state of each connections made at each of the units of operation, based on a result of comparing a design image generated based on the design information and the operation image, and outputting information indicating a determination result to a display section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a graphic illustrating an example of design information.

FIG. 4 is a graphic illustrating an example of superimposition information.

FIG. 7 is a graphic illustrating an example of superimposition information in which information has been added to placement information.

DESCRIPTION OF EMBODIMENTS

Detailed explanation follows regarding an example of an exemplary embodiment according to technology disclosed herein, with reference to the drawings.

First Exemplary Embodiment

Figure 1:
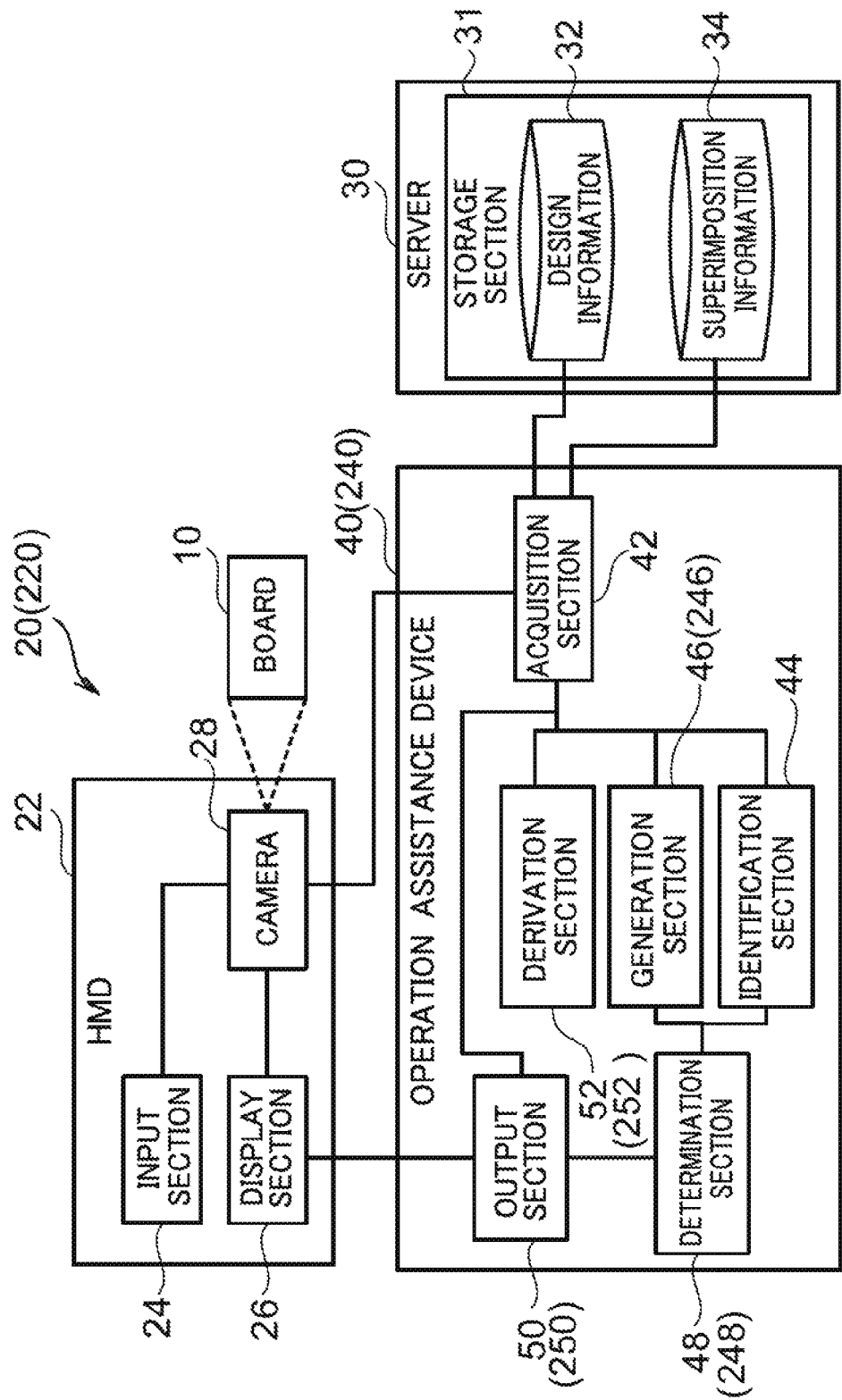
FIG. 1 is a functional block graphic illustrating a schematic configuration of an operation assistance system according to a first and second exemplary embodiment.

First, with reference to FIG. 1, explanation follows regarding a configuration of an operation assistance system 20 that assists testing operations by an operator who performs an operation to link plural devices provided at a board 10 and performs an operation to test the linkage state. As illustrated in FIG. 1, the operation assistance system 20 according to the present exemplary embodiment includes a head mounted display (HMD) 22, a server 30, and an operation assistance device 40. Examples of the operation assistance device 40 include portable devices such as smartphones and wearable computers.

The HMD 22 includes an input section 24, a display section 26, and a camera 28, and is worn on the head of the operator. When input with speech spoken by the operator, the input section 24 performs speech recognition on the input speech. The display section 26 is provided at a position visible to the operator when looking downward, in a state in which the HMD 22 is worn on the head of the operator. The camera 28 is provided in a position where capture in the direction faced by the face of the operator is possible, and video images captured by the camera 28 at specific capture intervals (a frame rate) are displayed on the display section 26. When speech giving an instruction to capture still images has been input through the input section 24 (speech stating "camera" in the present exemplary embodiment), the camera 28 captures still images and outputs the captured still images to the operation assistance device 40.

Design information 32 that includes position information regarding ports 12A to 12C, 14A to 14C, and 16A to 16C, described below, and that includes information indicating linkage configurations, and superimposition information 34, described below, are stored in a specific storage region of a storage section 31 of the server 30. Explanation follows regarding the board 10, the design information 32, and the superimposition information 34 according to the present exemplary embodiment, with reference to FIG. 2 to FIG. 4.

Figure 2:
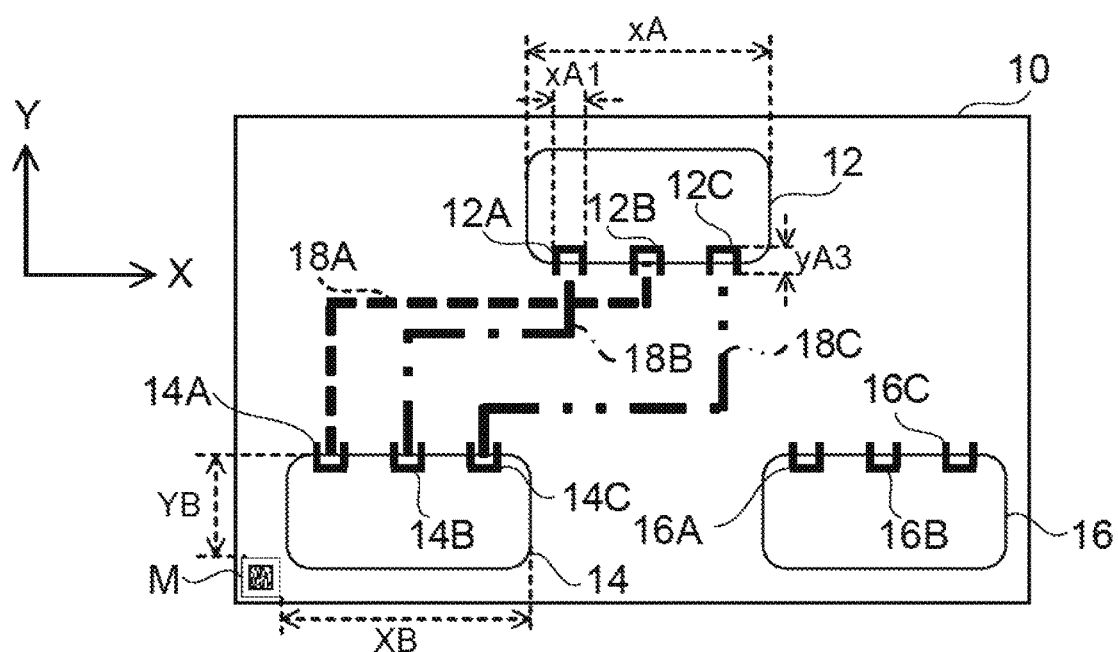
FIG. 2 is a plan view illustrating an example of a schematic configuration of a board subject to linkage according to the first and the second exemplary embodiment.

As illustrated in FIG. 2, the board 10 includes plural devices 12, 14, 16 (three in the present exemplary embodiment) subject to linkage by the operator. The devices 12, 14, 16 respectively include the ports 12A to 12C, 14A to 14C, and 16A to 16C, serving as examples of connection portions to be connected by respective cables. A rectangular marker M having a specific pattern is formed in a specific position on the board 10 (a position at a bottom left end portion of FIG. 2 in the present exemplary embodiment). The shape and the pattern of the marker M are not particularly limited as long as the marker M is identifiable.

In the present exemplary embodiment, explanation follows regarding a case in which the correct linkage state is a state in which a cable 18A is connected to the port 12B and the port 14A, a cable 18B is connected to the port 12A and the port 14B, and a cable 18C is connected to the port 12C and the port 14C. Hereafter, when the board 10 is viewed in plan view, a direction parallel to the long edges of the board 10 (the left-right direction in FIG. 2) is denoted the x-axis direction, and a direction parallel to the short edges of the board 10 (the up-down direction in FIG. 2) is denoted the y-axis direction. Moreover, the height direction of the board 10 (the direction into and out of FIG. 2) is denoted the z-axis direction hereafter.

As illustrated in FIG. 3, the dimensions and mounting position of each component out of the board 10, the devices 12, 14, 16, and the ports 12A to 12C, 14A to 14C, and 16A to 16C are stored in the design information 32. Dimensions of the marker M are also stored in the design information 32. Connection ports and connection flags of the ports 12A to 12C, 14A to 14C, and 16A to 16C are also stored in the design information 32.

Information indicating the length of each component in each direction out of the x-axis direction, the y-axis direction, and the z-axis direction is stored in the dimensions of the design information 32 according to the present exemplary embodiment, for each component. Information related to the position on the board 10 where each component is mounted relative to the position of the marker M is stored in the mounting positions of the design information 32.

More specifically, information indicating, for example, distances from an x-axis direction end portion of the marker M (a right end portion illustrated in FIG. 2) to end portions corresponding to the respective components is stored as the mounting positions in the x-axis direction in the present exemplary embodiment. Information indicating, for example, distances from a y-axis direction end portion of the marker M (an upper end portion illustrated in FIG. 2) to end portions corresponding to the respective components is also stored as the mounting positions in the y-axis direction. Information indicating, for example, distances from an upper face of the board 10 to upper faces of the respective components is also stored as the mounting positions in the z-axis direction.

As the information indicating the lengths and the information indicating the distances, actual dimensions may be employed, or pixel numbers or the like when design images, described below, are generated may be employed.

Information indicating a connection target port is stored as the connected port of the design information 32 for each port. Information indicating that the respective port has been connected ("1" in the present exemplary embodiment) or information indicating that the respective port is not yet connected ("0" in the present exemplary embodiment) is stored as the connection flag of the design information 32. Namely, in an initial state, prior to starting a linking operation of the board 10, "0" is stored as the connection flag.

Information for superimposed display on the display section 26 is stored in the superimposition information 34 according to the present exemplary embodiment. As illustrated in FIG. 4, text association information 34A for superimposed display of text on the display section 26, and graphic association information 34B for superimposed display of graphics on the display section 26, are included in the superimposition information 34.

Basic information, text information, and placement information are included in the text association information 34A. Basic information, graphic information, and placement information are included in the graphic association information 34B. A classification and a marker identification (ID) are included in the basic information of the text association information 34A and the graphic association information 34B. A projection method indicating a number of dimensions when displaying on the display section 26 is included in the placement information of the text association information 34A and the graphic association information 34B.

Text indicating a character string to be displayed on the display section 26, a font size for the character string, and a font color for the character string are included in the text information of the text association information 34A. A selection graphic indicating a graphic to be displayed on the display section 26 is included in the graphic information of the graphic association information 34B.

As illustrated in FIG. 1, the operation assistance device 40 includes an acquisition section 42, an identification section 44, a generation section 46, a determination section 48, an output section 50, and a derivation section 52.

In the linking operation that links the ports 12A to 12C, 14A to 14C, and 16A to 16C, the acquisition section 42 acquires an operation image captured by the camera 28 at each specific unit of operation. More specifically, the acquisition section 42 acquires operation images with operations that link together pairs of ports serving as single units of operation of the linking operation. The acquisition section 42 acquires each item of design information 32 and each item of superimposition information 34 from the server 30.

The identification section 44 identifies the positions of the ports 12A to 12C, 14A to 14C, and 16A to 16C respectively provided at the devices 12, 14, 16 in the operation image, based on the information of the marker M included in the operation image, and the design information 32. More specifically, the identification section 44 identifies the positions of the ports 12A to 12C, 14A to 14C, and 16A to 16C in the operation image based on the size, distortion, etc. of the marker M in the operation image, and the dimensions and mounting positions in the design information 32.

The generation section 46 generates a design image based on the design information 32. The generation section 46 generates an operation image scaled down to match the design image, based on the size, distortion, etc. of the marker M in the operation image, and on the dimensions and mounting positions in the design information 32.

The determination section 48 executes image analysis processing for the positions of the ports 12A to 12C, 14A to 14C, and 16A to 16C identified by the identification section 44. The determination section 48 then determines whether or not the connections made at each of the units of operation are satisfactory based on a result of comparing the design image against the operation image via the image analysis processing.

The output section 50 outputs information indicating the determination result made by the determination section 48 to the display section 26 of the HMD 22. Based on the operation image and the superimposition information 34 acquired by the acquisition section 42 prior to the linking operation of each unit of operation, the output section 50 adds specific information as placement information in the superimposition information 34 for that unit of operation, and outputs the specific information to the display section 26 of the HMD 22.

The derivation section 52 derives an operation sequence for the linking operation by the operator based on the design information 32 acquired by the acquisition section 42. More specifically, the derivation section 52 according to the present exemplary embodiment derives the operation sequence such that, out of each port subject to linkage, linkage is performed in sequence from the ports having the shortest inter-port distance apart, based on the dimensions, mounting positions, and connected ports of the design information 32. Note that the operation sequence is not limited to this example, and may be another sequence such as a port number sequence or a sequence of furthest distance from a specific position (the position of the operator).

Figure 5:
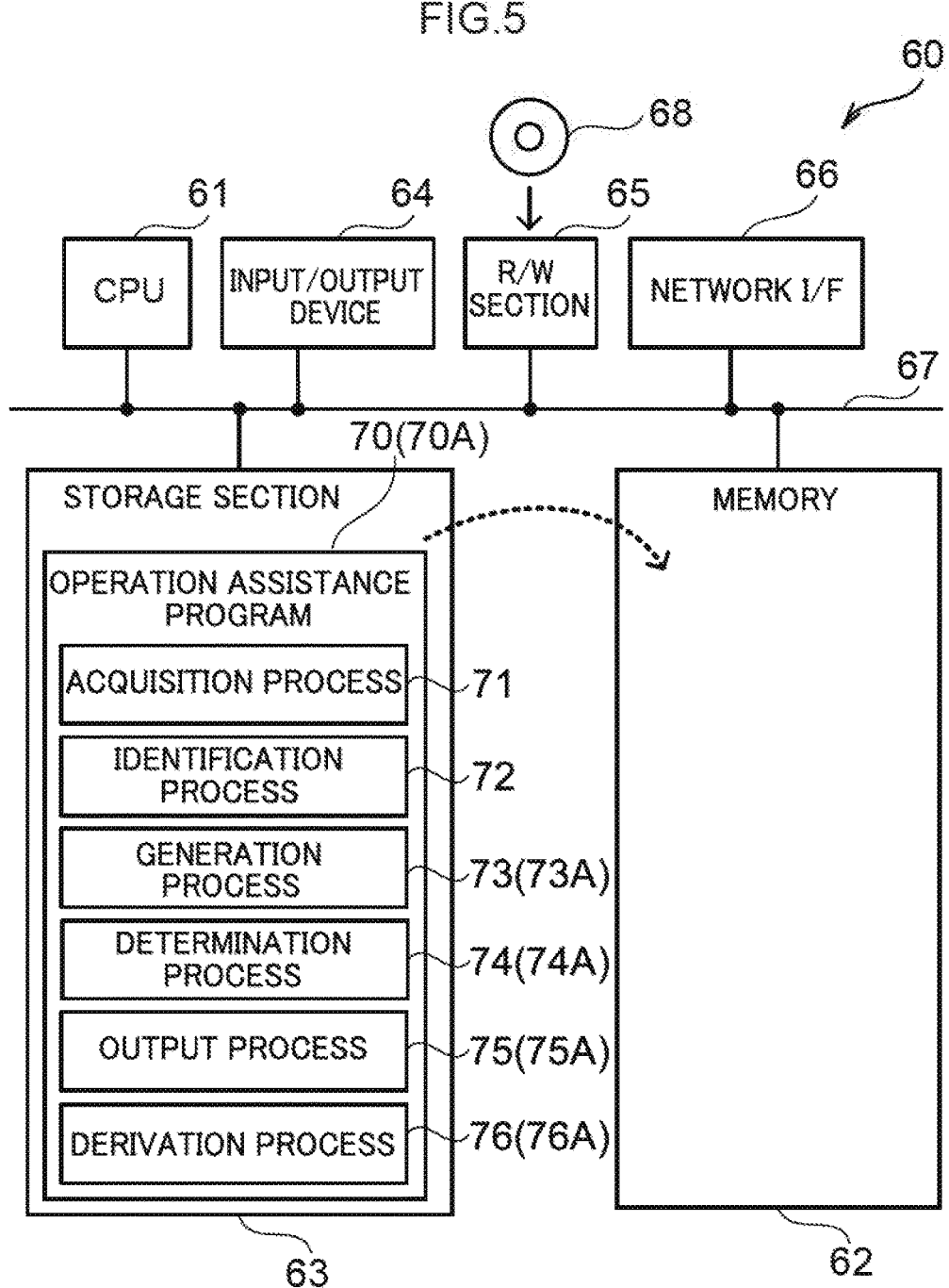
FIG. 5 is a block graphic illustrating a schematic configuration of a computer that functions as the operation assistance device according to the first and the second exemplary embodiment.

The operation assistance device 40 may, for example, be implemented by the computer 60 illustrated in FIG. 5. The computer 60 includes a central processing unit (CPU) 61, memory 62 serving as a temporary storage region, and a non-volatile storage section 63. The computer 60 includes an input/output device 64, an R/W section 65 that controls reading and writing of data from and to a recording medium 68, and a network I/F 66 that is connected to a network such as the Internet. The CPU 61, the memory 62, the storage section 63, the input/output device 64, the R/W section 65, and the network I/F 66 are connected to one another through a bus 67.

The storage section 63 may be implemented by a hard disk drive (HDD), a solid state drive (SSD), flash memory, or the like. An operation assistance program 70 for causing the computer 60 to function as the operation assistance device 40 is stored in the storage section 63, which serves as a storage medium. The operation assistance program 70 includes an acquisition process 71, an identification process 72, a generation process 73, a determination process 74, an output process 75, and a derivation process 76.

The CPU 61 reads the operation assistance program 70 from the storage section 63, expands the operation assistance program 70 into the memory 62, and sequentially executes the processes included in the operation assistance program 70. The CPU 61 operates as the acquisition section 42 illustrated in FIG. 1 by executing the acquisition process 71. The CPU 61 also operates as the identification section 44 illustrated in FIG. 1 by executing the identification process 72. The CPU 61 also operates as the generation section 46 illustrated in FIG. 1 by executing the generation process 73. The CPU 61 also operates as the determination section 48 illustrated in FIG. 1 by executing the determination process 74. The CPU 61 also operates as the output section 50 illustrated in FIG. 1 by executing the output process 75. The CPU 61 also operates as the derivation section 52 illustrated in FIG. 1 by executing the derivation process 76. The computer 60, which executes the operation assistance program 70, thereby functions as the operation assistance device 40.

Note that functionality implemented by the operation assistance program 70 may, for example, be implemented by a semiconductor integrated circuit, and more specifically, by an application specific integrated circuit (ASIC) or the like.

Next, explanation follows regarding operation of the operation assistance system 20 according to the present exemplary embodiment. When an instruction to start the linking operation by the operator has been input to the operation assistance device 40, the operation assistance device 40 executes the operation assistance processing illustrated in FIG. 6 by executing the operation assistance program 70.

Figure 6:
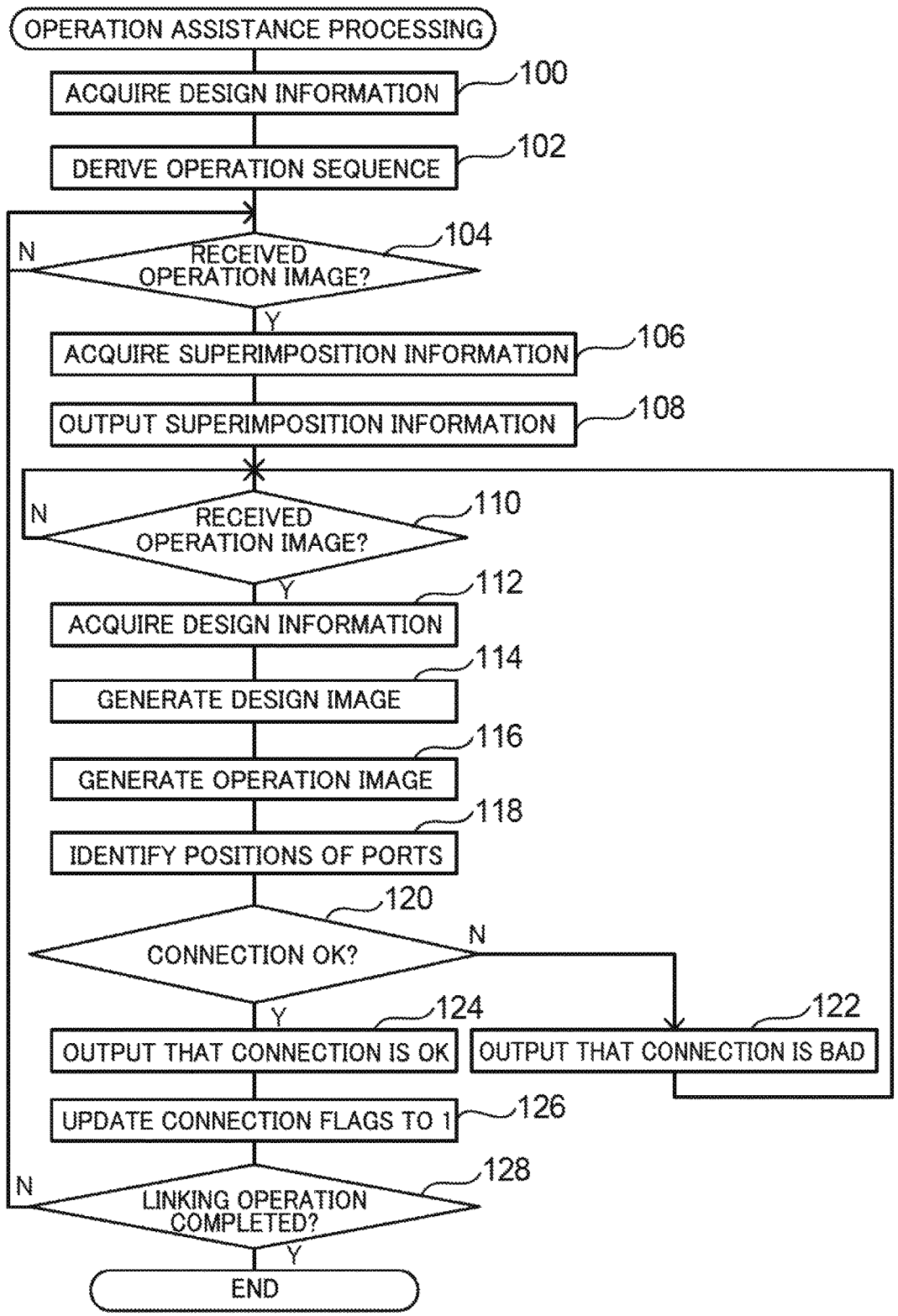
FIG. 6 is a flowchart illustrating an example of operation assistance processing according to the first exemplary embodiment.

At step 100 of the operation assistance processing illustrated in FIG. 6, the acquisition section 42 acquires the design information 32 from the server 30. At the next step 102, the derivation section 52 derives the operation sequence such that, out of each port subject to linkage, linkage is made in sequence from the ports having the shortest inter-port distance apart, based on the dimensions, mounting positions, and connected ports of the design information 32 acquired at step 100. Explanation follows regarding a case in which an operation to link together port 12A and port 14B is performed as the first operation (referred to as "operation 1" hereafter). Explanation also follows regarding a case in which an operation to link together port 12B and port 14A is performed as the second operation (referred to as "operation 2" hereafter). Explanation also follows regarding a case in which an operation to link together port 12C and port 14C is performed as the third operation (referred to as "operation 3" hereafter).

Execution of the processing of each step below is repeated for each linking operation in the sequence derived at step 102.

When performing each linking operation on the ports, the operator refers to the display section 26 and checks that the entire board 10 is being captured by the camera 28, and says the word "camera". Speech stating "camera" is thereby input through the input section 24, the camera 28 captures a still image (operation image) at the point in time when the speech was input, and the camera 28 transmits the still image to the operation assistance device 40. At step 104, the acquisition section 42 stands by until the operation image is received. When the operation image has been received, affirmative determination is made at step 104 and processing transitions to step 106.

At step 106, the acquisition section 42 acquires the superimposition information 34 from the server 30. At the next step 108, the output section 50 adds specific information serving as placement information of the superimposition information 34, based on the dimensions and mounting positions of the ports subject to linkage in the design information 32, and on the size, distortion, etc. of the marker M on the operation image received at step 104. More specifically, as illustrated in FIG. 7, as respective placement information for the text association information 34A and the graphic association information 34B, the output section 50 adds a coordinate position, a rotational angle, and a scale (enlargement or reduction ratio) for each direction out of the x-axis direction, the y-axis direction, and the z-axis direction.

More specifically, the output section 50 adds a coordinate position, a rotational angle, and a scale as the placement information of the text association information 34A, such that the text is displayed at a position that avoids the ports subject to linkage and the linkage pathway between the ports. Moreover, the output section 50 adds a coordinate position, a rotational angle, and a scale as the placement information of the graphic association information 34B, such that the ports subject to linkage are enclosed by a selection graphic from the graphic association information 34B.

Figure 8:
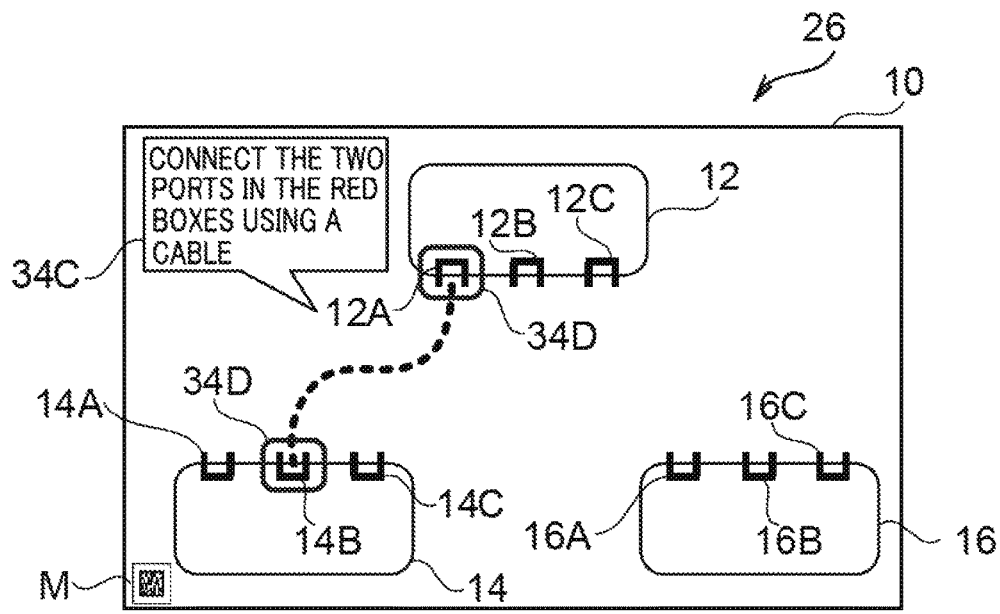
FIG. 8 is a graphic illustrating an example of an operation assistance screen prior to an operation of an operation 1.
Figure 9:
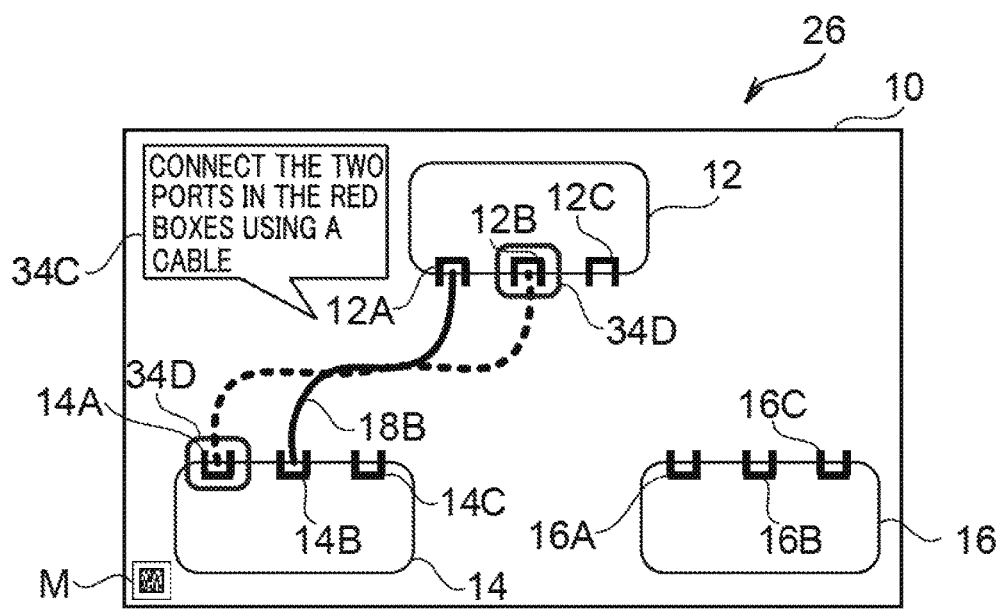
FIG. 9 is a graphic illustrating an example of an operation assistance screen prior to an operation of an operation 2.
Figure 10:
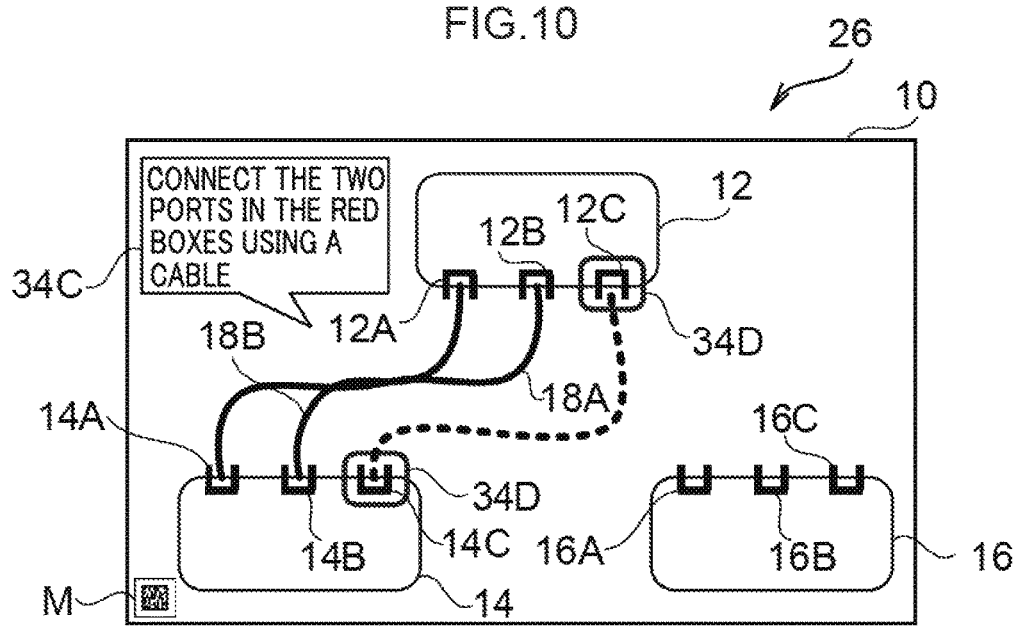
FIG. 10 is a graphic illustrating an example of an operation assistance screen prior to an operation of an operation 3.

The output section 50 then outputs the superimposition information 34, with the information added thereto, to the HMD 22. When the superimposition information 34 has been input from the operation assistance device 40, the HMD 22 displays the information superimposed on the display section 26 based on the input superimposition information 34. An example of an operation assistance screen in which the information based on the superimposition information 34 is displayed superimposed on the display section 26 is illustrated in FIG. 8 to FIG. 10. FIG. 8 illustrates an example of an operation assistance screen displayed prior to the linking operation of operation 1, FIG. 9 illustrates an example of an operation assistance screen displayed prior to the linking operation of operation 2, and FIG. 10 illustrates an example of an operation assistance screen displayed prior to the linking operation of operation 3.

As illustrated in FIG. 8 to FIG. 10, in the present exemplary embodiment, text 34C based on the text association information 34A, and a graphic 34D based on the graphic association information 34B are displayed superimposed on the display section 26 prior to the linking operations. Accordingly, the probability of the operator making an error when linking the ports subject to linkage can be reduced. Note that lines indicating the linkage path (the dashed lines illustrated in FIG. 8 to FIG. 10) may be displayed superimposed as illustrated in FIG. 8 to FIG. 10. Moreover, as illustrated in FIG. 8 to FIG. 10, the text 34C may be displayed in a box as a speech bubble.

When the operation assistance screen is displayed on the HMD 22, the operator links the pair of ports in accordance with the contents displayed on the operation assistance screen. The operator then says the word "camera" after linking the pair of ports. Accordingly, when the speech stating "camera" has been input through the input section 24, the camera 28 captures a still image (operation image) at the point in time when the speech was input, and transmits the still image to the operation assistance device 40. At step 110, the acquisition section 42 stands by until the operation image is received. When the operation image has been received, affirmative determination is made at step 110, and processing transitions to step 112.

At step 112, the acquisition section 42 acquires the design information 32 from the server 30. At the next step 114, the generation section 46 generates the design image based on the design information 32 acquired at step 112. More specifically, the generation section 46 generates the design image of the state in which the ports that are subject to linkage at this point in time have been linked by a cable, based on the design information 32 acquired at step 112. For example, if this point in time is the point in time at which operation 1 has completed, the generation section 46 generates the design image of the state in which the port 12A and the port 14B are linked together.

Figure 11:
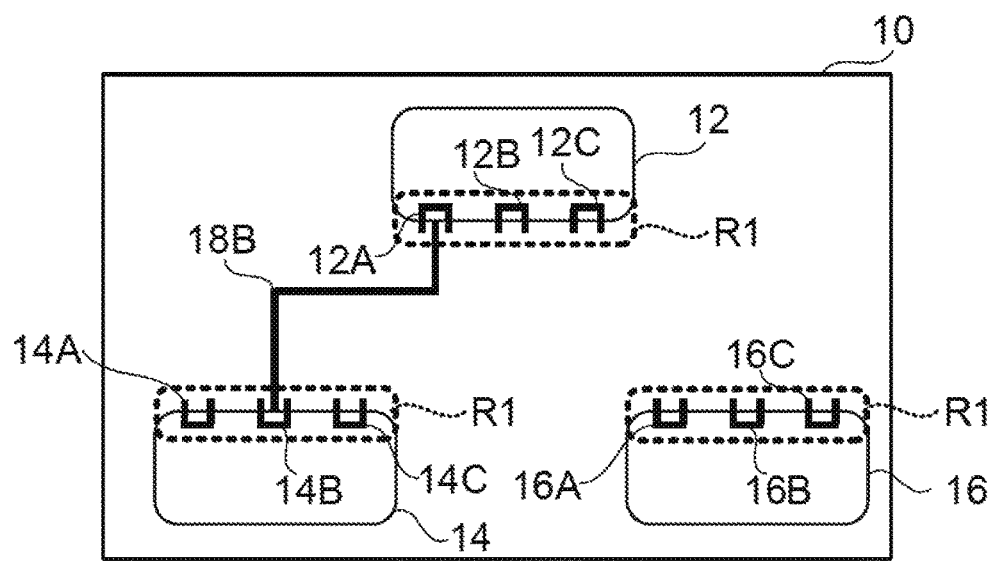
FIG. 11 is a graphic illustrating an example of a design image after an operation of an operation 1.
Figure 12:
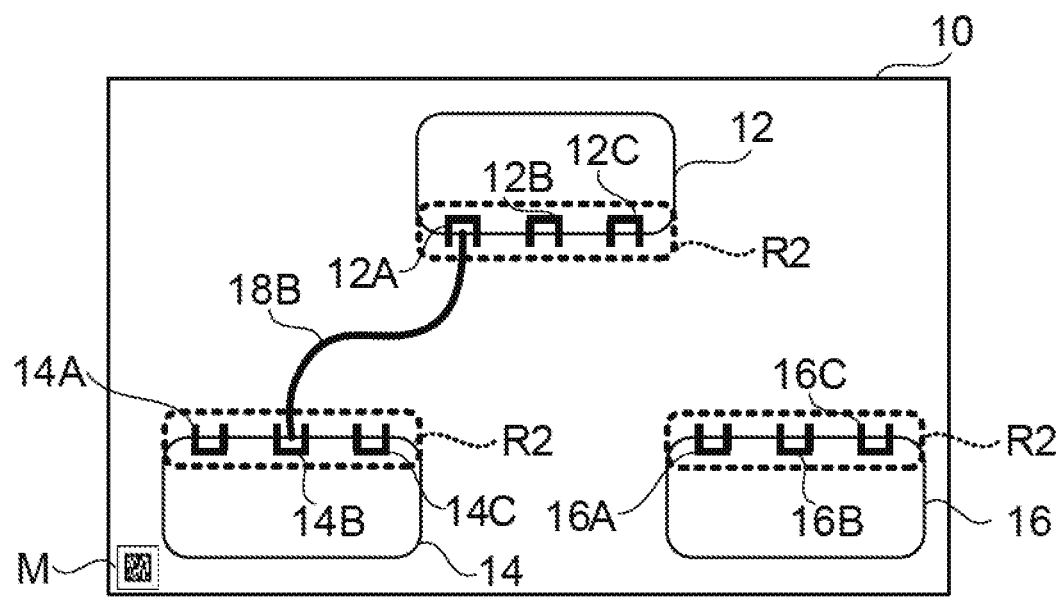
FIG. 12 is a graphic illustrating an example of an operation image after an operation of an operation 1.
Figure 13:
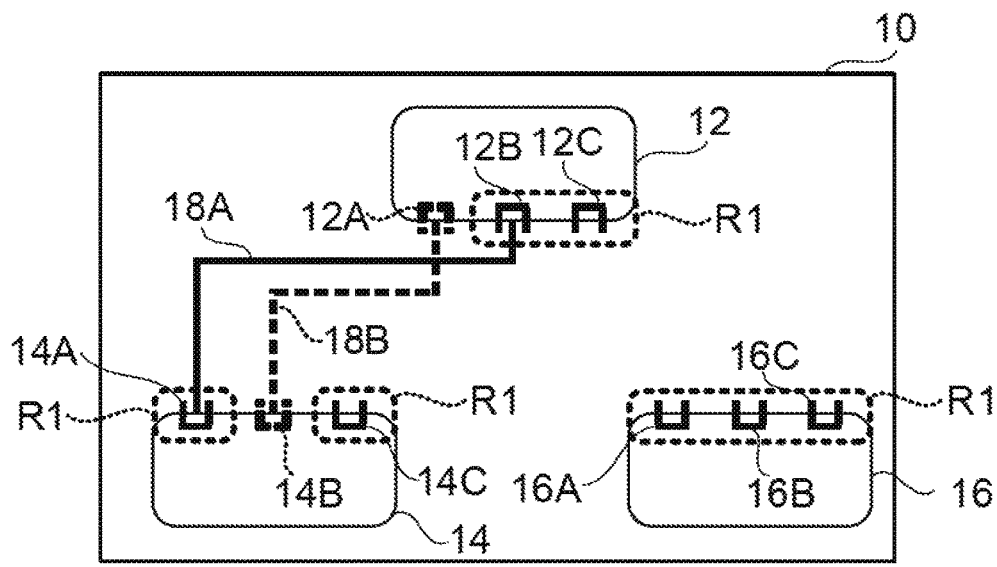
FIG. 13 is a graphic illustrating an example of a design image after an operation of an operation 2.
Figure 14:
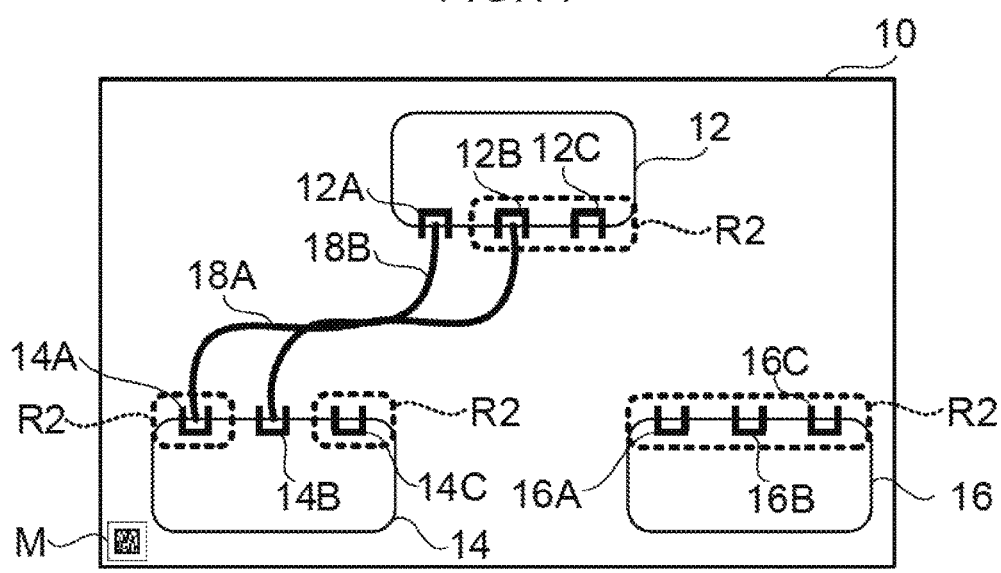
FIG. 14 is a graphic illustrating an example of an operation image after an operation of an operation 2.
Figure 15:
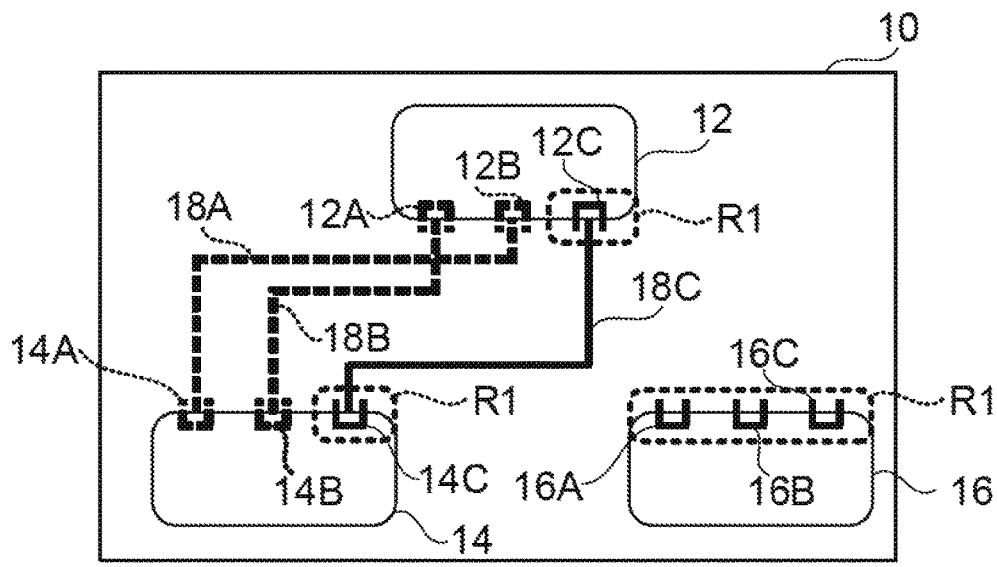
FIG. 15 is a graphic illustrating an example of a design image after an operation of an operation 3.
Figure 16:
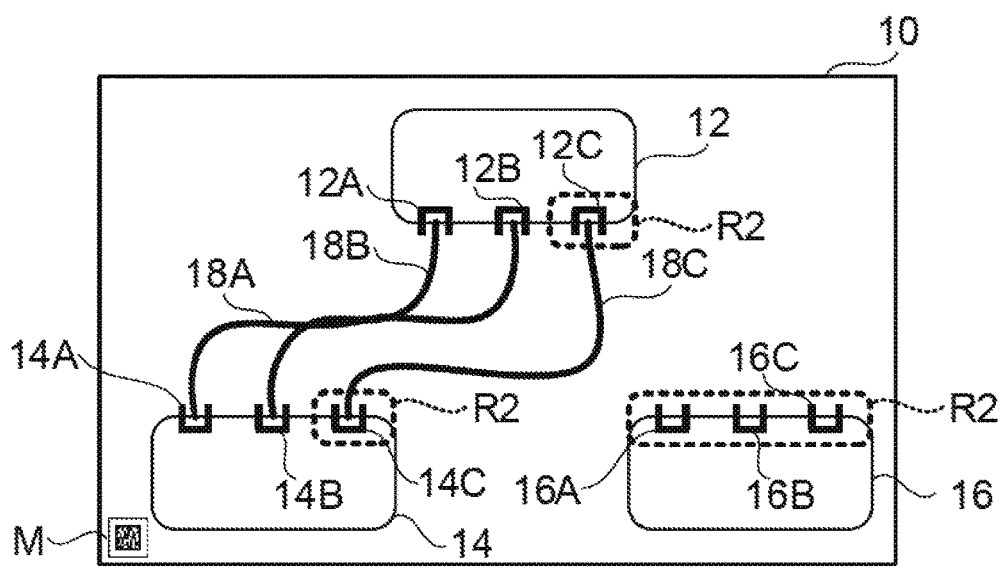
FIG. 16 is a graphic illustrating an example of an operation image after an operation of an operation 3.

At step 116, the generation section 46 generates the operation image matching the design image generated at step 114 at the scale and angle of the operation image based on the size, distortion, etc. of the marker M of the operation image received at step 110, and on the design information 32. FIG. 11, FIG. 13, and FIG. 15 respectively illustrate examples of design images generated at step 114 after the linking operations of operation 1 to operation 3. Moreover, FIG. 12, FIG. 14, and FIG. 16 respectively illustrate examples of operation images generated at step 116 after the linking operations of operation 1 to operation 3.

At step 118, the identification section 44 identifies the position of the ports in the operation image based on the marker M included in the operation image generated at step 116 and the design information 32 acquired at step 112. Note that the identification section 44 according to the present exemplary embodiment identifies the position of the ports in the design information 32 acquired at step 112, other than ports having "1" as the connection flag as non-subject ports. The identification section 44 then identifies a specific range, which includes the positions of the identified ports, as the comparison range R at which the design image and the operation image are to be compared at step 120, described below. The comparison range R of the design image identified at the current step 118 is denoted R1 in FIG. 11, FIG. 13, and FIG. 15, and the comparison range R of the operation image is denoted R2 in FIG. 12, FIG. 14, and FIG. 16. For example, after the operation of operation 2, a comparison range R is identified such that the R1 illustrated in FIG. 13 and the R2 illustrated in FIG. 14 exclude the positions of the ports 12A, 14B that were connected together by operation 1.

At step 120, the determination section 48 executes image analysis processing for the comparison range R identified at step 118. The determination section 48 then determines whether or not the connection between the ports subject to linkage is satisfactory based on the result of comparing the design image and the operation image via the image analysis processing. More specifically, as an example, the determination section 48 performs image analysis processing to derive the degree of similarity between the images of the comparison range R1 and the comparison range R2, and determines whether or not the images are "OK", which indicates that a connection is good, based on whether or not the degree of similarity is a specific threshold value (for example, 90%) or above. Processing transitions to step 124 in cases in which the determination is an affirmative determination, or processing transitions to step 122 in cases in which the determination is a negative determination.

At step 122, the output section 50 outputs information indicating "BAD", which indicates that the connection is not good, to the HMD 22, and processing then returns to step 110. More specifically, as an example, the output section 50 outputs, to the HMD 22, superimposition information 34 in which the text of the text association information 34A of the superimposition information 34 output at step 108 has been replaced by a character string prompting reconnection. A character string prompting reconnection and a graphic are thereby displayed on the display section 26 of the HMD 22. As a result, the operator can ascertain that reconnection needs to be made.

However, at step 124, the output section 50 outputs, to the HMD 22, information indicating that the connection is "OK". More specifically, as an example, the output section 50 outputs, to the HMD 22, a character string indicating that the connection result is normal.

At the next step 126, the output section 50 updates the connection flag of the design information 32 to "1" for ports for which linking has completed. At the next step 128, the output section 50 determines whether or not the linking operations have completed by determining whether or not the connection flags have become "1" for all of the ports subject to linkage. Processing returns to step 104 in cases in which the determination is a negative determination, or the current operation assistance processing terminates in cases in which the determination is an affirmative determination.

As explained above, according to the present exemplary embodiment, the precision of operation assistance is improved by determining whether or not the connections made at each of the units of operation are satisfactory.

Moreover, according to the present exemplary embodiment, the design image and the operation image, which are the comparison subjects, are constrained to a comparison range R that includes ports other than the ports for which linkage has completed. This enables the amount of arithmetic in the comparison processing of the design image and the operation image to be reduced. Moreover, setting the comparison range R to a range surrounding the ports enables the comparison to be made using the degree of similarity at connection portions where the shape of the cable with respect to the ports is likely to be a predetermined shape, while excluding intermediate portions of cables that are liable to have indeterminate shapes, and therefore improves the determination precision of the comparison processing.

Second Exemplary Embodiment

Next, explanation follows regarding a second exemplary embodiment. In the operation assistance system according to the present exemplary embodiment, portions similar to those of the operation assistance system according to the first exemplary embodiment are allocated the same reference numerals and detailed explanation thereof is omitted. In the present exemplary embodiment, in addition to the board 10 according to the first exemplary embodiment, explanation is also given regarding an example of a board 210 illustrated in FIG. 17 to FIG. 19 serving as a linkage subject.

Figure 17:
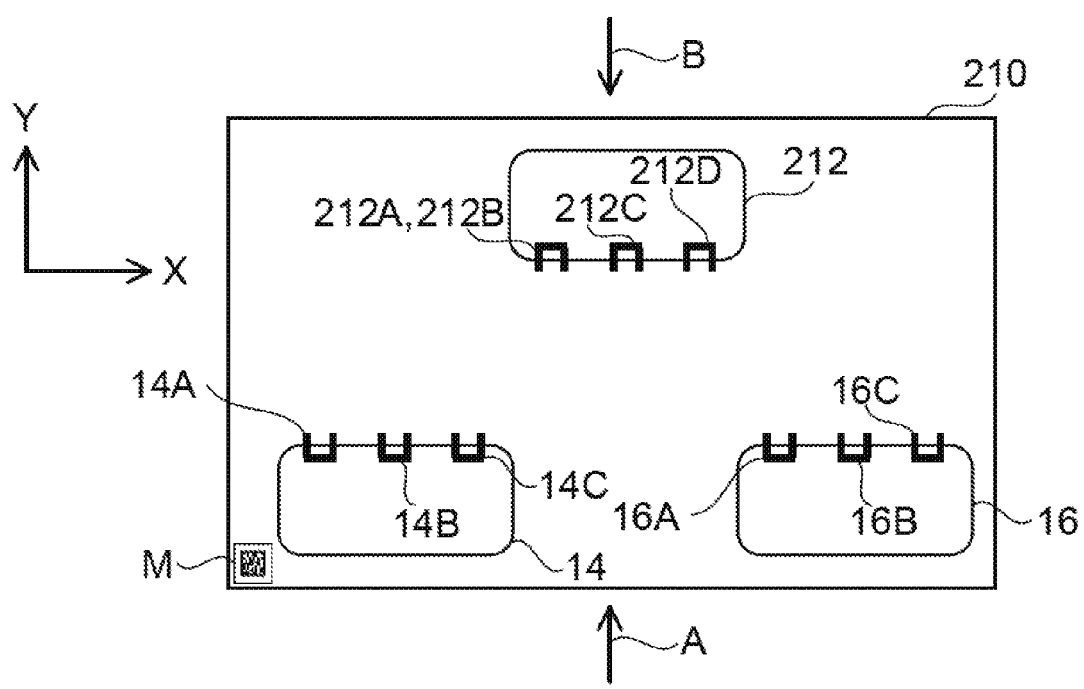
FIG. 17 is a plan view illustrating a schematic configuration of a board subject to linkage according to the second exemplary embodiment.
Figure 18:
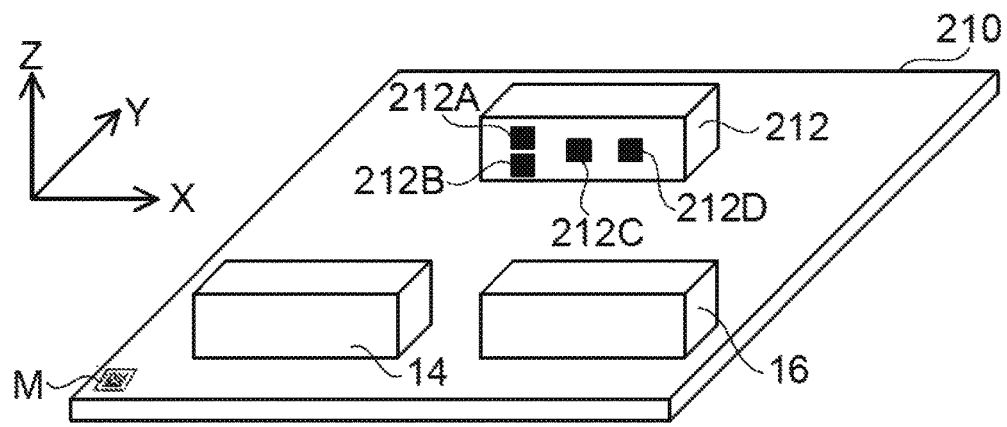
FIG. 18 is a perspective view of the board of FIG. 17, viewed along the direction of the arrow A from diagonally above a face side to which devices are mounted.
Figure 19:
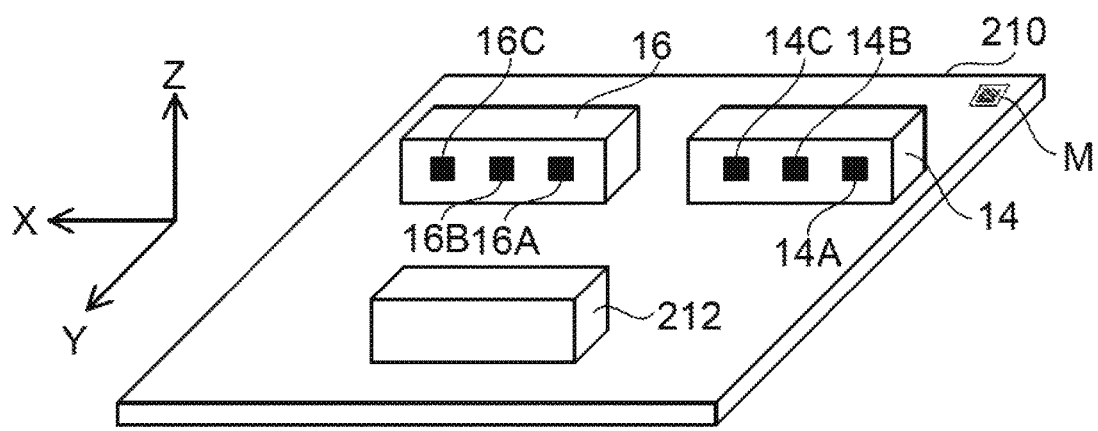
FIG. 19 is a perspective view of the board of FIG. 17, viewed along the direction of the arrow B from diagonally above a face side to which devices are mounted.

First, explanation follows regarding a configuration of the board 210, with reference to FIG. 17 to FIG. 19. Note that portions in FIG. 17 to FIG. 19 similar to those of FIG. 2 are allocated the same reference numerals as in FIG. 2 and detailed explanation thereof is omitted.

As illustrated in FIG. 17 to FIG. 19, the board 210 includes plural devices 212, 14, 16 (three in the present exemplary embodiment) that are subject to linkage by the operator. The device 212 includes ports 212A to 212D as examples of connection portions where respective cables are connected. The port 212A and the port 212B are provided at positions that overlap when viewed in plan view. Hereafter, configurations provided with positions that overlap when viewed in plan view, like the port 212A and the port 212B, are referred to as "multi-level configurations".

Next, explanation follows regarding a configuration of an operation assistance system 220 according to the present exemplary embodiment, with reference to FIG. 1. As illustrated in FIG. 1, the operation assistance system 220 includes the HMD 22, the server 30, and an operation assistance device 240. The operation assistance device 240 includes the acquisition section 42, the identification section 44, a generation section 246, a determination section 248, an output section 250, and a derivation section 252.

The determination section 248 has the following functionality in addition to the functionality of the determination section 48 according to the first exemplary embodiment. The determination section 248 determines whether or not there are ports in a multi-level configuration based on the dimensions and mounting positions of the design information 32 acquired by the acquisition section 42, and identifies the multi-level configured ports in cases in which there are multi-level configured ports.

The derivation section 252 derives an operation sequence of the linking operations by the operator based on the design information 32 acquired by the acquisition section 42. More specifically, the derivation section 252 according to the present exemplary embodiment derives the operation sequence such that, out of each port subject to linkage, linkage is performed in sequence from the ports having the shortest inter-port distance apart, based on the dimensions, mounting positions, and connected ports of the design information 32. The derivation section 252 further derives the operation sequence such that, in cases in which the determination section 248 has determined that there are ports in a multi-level configuration, linkage is performed in sequence from the lowest level port.

The output section 250 has the following functionality in addition to the functionality of the output section 50 according to the first exemplary embodiment. In cases in which the determination section 248 has determined that there are ports in a multi-level configuration, the output section 250 outputs, to the display section 26 of the HMD 22, the superimposition information 34 in which information has been added indicating a character string stating that an image is to be captured at a position where the port is visible.

The generation section 246 has the following functionality in addition to the functionality of the generation section 46 according to the first exemplary embodiment. In cases in which the determination section 248 has determined that there are ports in a multi-level configuration, the generation section 246 generates a design image of a state in which the ports are visible when generating the design image.

The operation assistance device 240 may, for example, be implemented by the computer 60 illustrated in FIG. 5, similarly to in the first exemplary embodiment. An operation assistance program 70A for causing the computer 60 to function as operation assistance device 240 is stored in the storage section 63 of the computer 60. The operation assistance program 70A includes the acquisition process 71, the identification process 72, a generation process 73A, a determination process 74A, an output process 75A, and a derivation process 76A.

The CPU 61 reads the operation assistance program 70A from the storage section 63, expands the operation assistance program 70A into the memory 62, and sequentially executes the processes included in the operation assistance program 70A. The CPU 61 operates as the generation section 246 illustrated in FIG. 1 by executing the generation process 73A. The CPU 61 also operates as the determination section 248 illustrated in FIG. 1 by executing the determination process 74A. The CPU 61 also operates as the output section 250 illustrated in FIG. 1 by executing the output process 75A. The CPU 61 also operates as the derivation section 252 illustrated in FIG. 1 by executing the derivation process 76A. Other processes are similar to those of the operation assistance program 70 according to the first exemplary embodiment. The computer 60, which executes the operation assistance program 70A, thereby functions as the operation assistance device 240.

Note that functionality implemented by the operation assistance program 70A may, for example, be implemented by a semiconductor integrated circuit, and more specifically, by an ASIC or the like.

Next, explanation follows regarding operation of the operation assistance system 220 according to the present exemplary embodiment. In the operation assistance device 240, when an instruction to start the linking operation by the operator has been input, the operation assistance device 240 executes the operation assistance processing illustrated in FIG. 20 by executing the operation assistance program 70A.

Figure 20:
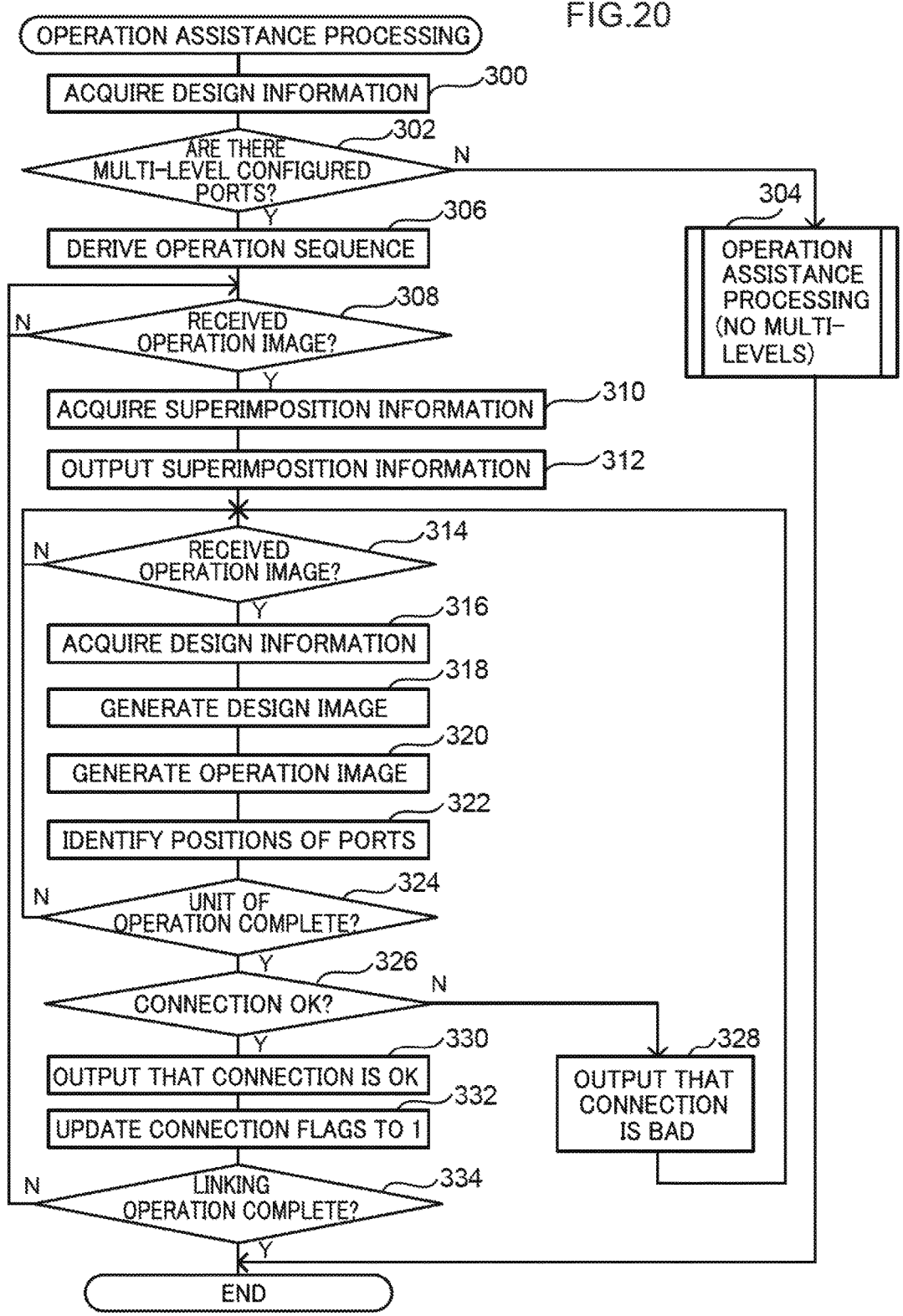
FIG. 20 is a flowchart illustrating an example of operation assistance processing according to the second exemplary embodiment.

At step 300 of the operation assistance processing illustrated in FIG. 20, the acquisition section 42 acquires the design information 32 from the server 30. At the next step 302, the determination section 248 determines whether or not there are ports in a multi-level configuration based on the dimensions and mounting positions of the design information 32 acquired at step 300. Processing transitions to step 304 in cases in which the determination is a negative determination, or processing transitions to step 306 in cases in which the determination is an affirmative determination.

At step 304, the operation assistance device 240 ends the present operation assistance processing after executing processing similar to step 102 to step 128 of the operation assistance processing according to the first exemplary embodiment. However, at step 306, the derivation section 252 derives the operation sequence of the linking operation by the operator based on the design information 32 acquired at step 300. Explanation follows regarding a case in which an operation to link together port 212B and port 14B is performed as the first operation (referred to as "operation 1" hereafter).

Similarly to in step 104 above, at step 308, the acquisition section 42 stands by until the operation image is received. When the operation image has been received, affirmative determination is made at step 308, and processing transitions to step 310. At step 310, the acquisition section 42 acquires the superimposition information 34 from the server 30.

Similarly to in step 108 above, at the next step 312, the output section 250 adds information as the placement information of the superimposition information 34, based on the dimensions and mounting positions of the ports subject to linkage in the design information 32, and on the size, distortion, etc. of the marker M on the operation image received at step 308. The output section 250 then outputs, to the display section 26 of the HMD 22, the superimposition information 34 in which the information has been added indicating a character string stating that an image is to be captured at a position where the port is visible.

Figure 21:
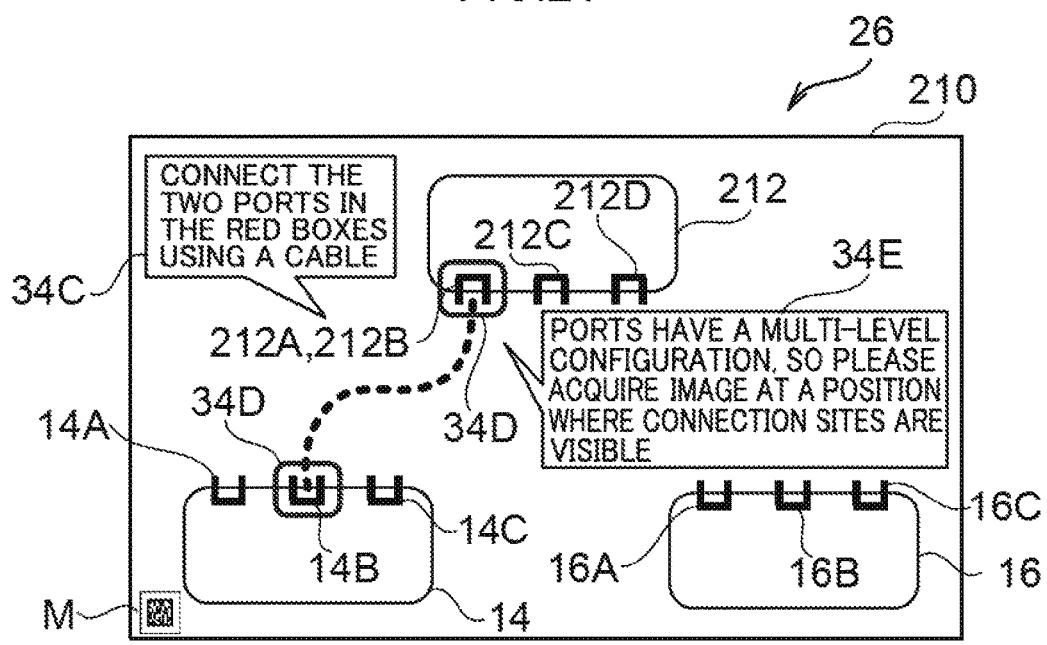
FIG. 21 is a graphic illustrating an example of an operation assistance screen prior to an operation of an operation 1.

When the superimposition information 34 has been input from the operation assistance device 240, the HMD 22 displays the information superimposed on the display section 26 based on the input superimposition information 34. FIG. 21 illustrates an example of an operation assistance screen in which the information based on the superimposition information 34 is displayed superimposed on the display section 26. Note that FIG. 21 illustrates an example of an operation assistance screen displayed prior to the linking operation of operation 1.

As illustrated in FIG. 21, in the present exemplary embodiment, similarly to in the first exemplary embodiment, the text 34C and the graphic 34D are displayed superimposed on the display section 26. Moreover, in the present exemplary embodiment, text 34E, based on information indicating a character string stating that an image is to be captured at a position where the port added at step 312 is visible, is displayed superimposed on the display section 26.

When the operation assistance screen is displayed on the HMD 22, the operator links the pair of ports in accordance with the content displayed on the operation assistance screen. The operator then says the word "camera" at a position where the port subject to connection is visible, at each time connection of a cable is made to a single port. Speech stating "camera" is thereby input through the input section 24, the camera 28 captures a still image (operation image) at the point in time when speech was input, and the camera 28 transmits the still image to the operation assistance device 240. At step 314, the acquisition section 42 stands by until the operation image is received. When the operation image has been received, affirmative determination is made at step 314 and processing transitions to step 316.

At step 316, the acquisition section 42 acquires the design information 32 from the server 30. Similarly to step 114, at the next step 318, the generation section 246 generates a design image based on the design information 32 acquired at step 316. The generation section 246 generates the design image of a state in which the port subject to linkage is visible when generating the design image.

Similarly to at step 116, at step 320, the generation section 246 generates the operation image with the scale and angle of the operation image matching the design image generated at step 318, based on the size, distortion, etc. of the marker M of the operation image received as step 314, and on the design information 32.

Similarly to step 118, at the next step 322, the identification section 44 identifies the position of the port in the operation image based on the marker M included in the operation image generated at step 320 and on the design information 32 acquired at step 316. The identification section 44 then identifies a specific range that includes the positions of the identified ports as the comparison range R of the design image and the operation image.

At the next step 324, the identification section 44 determines whether or not the unit of operation has completed by determining whether or not the processing of steps 314 to step 322 has completed for the pair of ports subject to linkage. Processing returns to step 314 in cases in which the determination is a negative determination, and processing transitions to step 326 in cases in which the determination is an affirmative determination.

Figure 22:
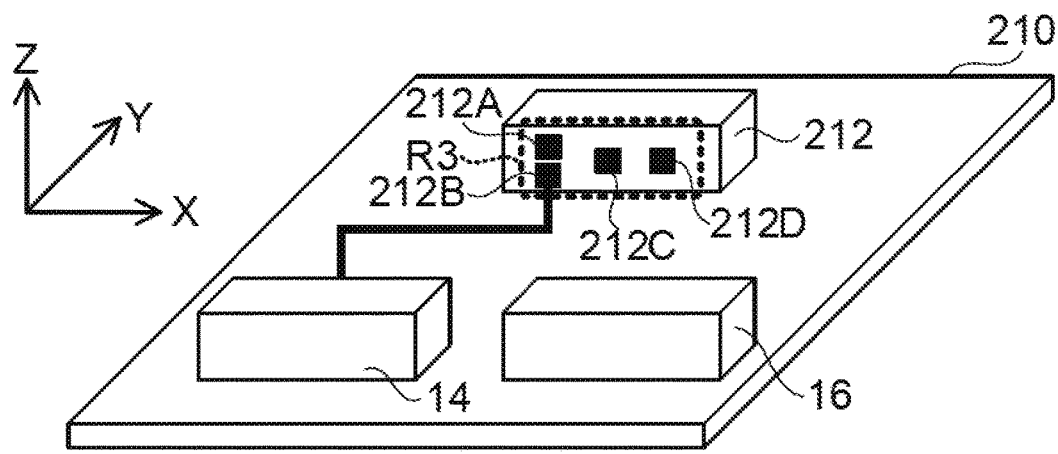
FIG. 22 is a graphic illustrating an example of a design image after an operation of an operation 1, and is a perspective view of the board of FIG. 17, viewed along the direction of the arrow A from diagonally above a face side to which devices are mounted.
Figure 23:
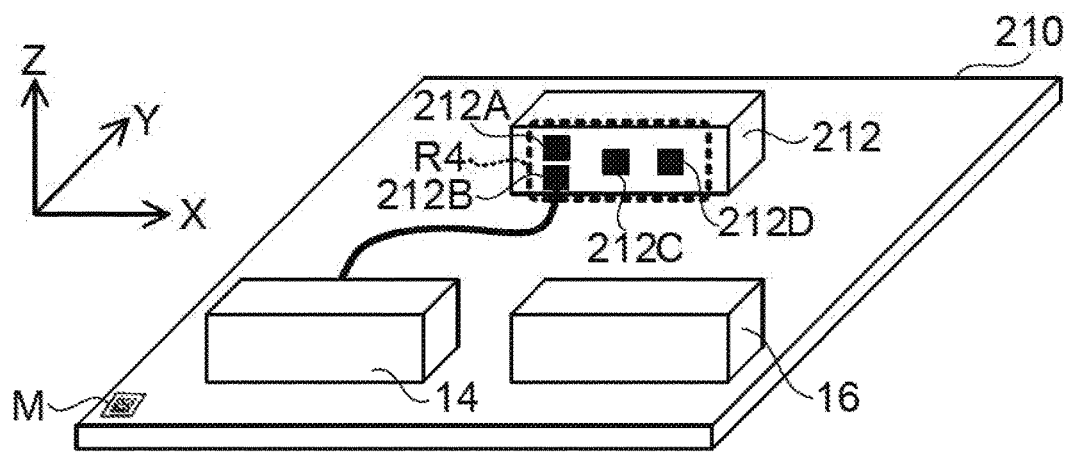
FIG. 23 is a graphic illustrating an example of an operation image after an operation of an operation 1, and is a perspective view of the board of FIG. 17, viewed along the direction of the arrow A from diagonally above a face side to which devices are mounted.

FIG. 22 illustrates an example of a design image generated at step 318 a first time for the operation 1. FIG. 23 illustrates an example of an operation image generated at step 320 the first time for the operation 1. In the operation 1, the comparison range of the design image identified at step 322 the first time is illustrated as R3 in FIG. 22, and the comparison range of the operation image is illustrated as R4 in FIG. 23.

Figure 24:
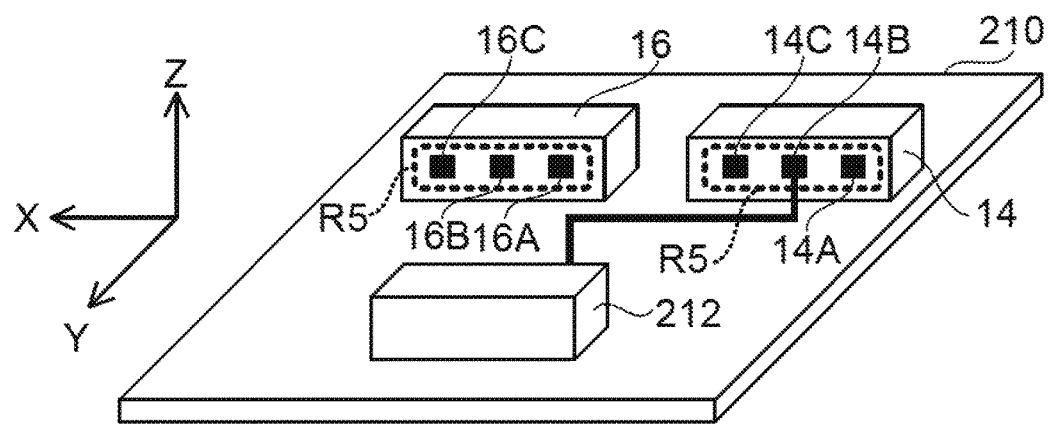
FIG. 24 is a graphic illustrating an example of a design image after an operation of an operation 1, and is a perspective view of the board of FIG. 17, viewed along the direction of the arrow B from diagonally above a face side to which devices are mounted.
Figure 25:
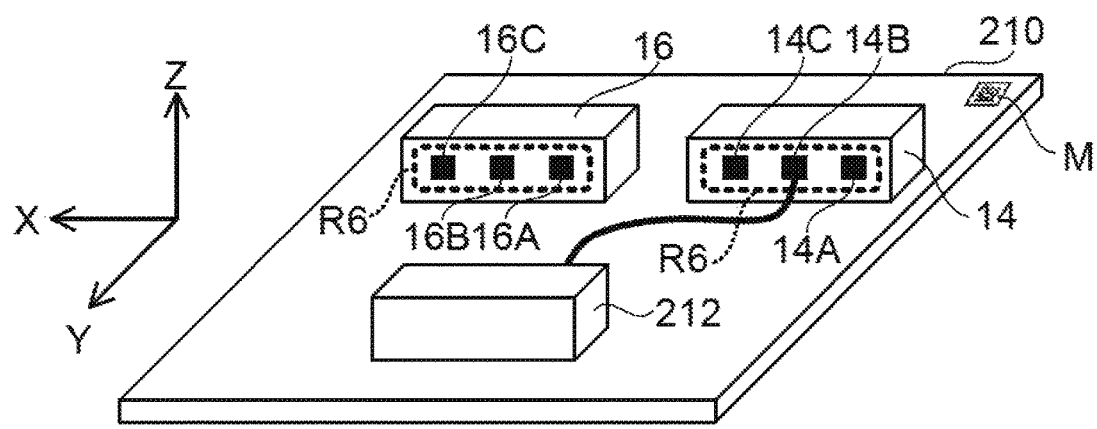
FIG. 25 is a graphic illustrating an example of an operation image after an operation of an operation 1, and is a perspective view of the board of FIG. 17, viewed along the direction of the arrow B from diagonally above a face side to which devices are mounted.

FIG. 24 illustrates an example of a design image generated at step 318 a second time for the operation 1. FIG. 25 illustrates an example of an operation image generated at step 320 the second time for the operation 1. In the operation 1, the comparison range of the design image identified at step 322 the second time is illustrated as R5 in FIG. 24, and the comparison range of the operation image is illustrated as R6 in FIG. 25.

At step 326, the determination section 248 executes image analysis processing for the comparison range R identified at step 322. The determination section 248 then determines whether or not the connection between the port subjects to linkage is satisfactory based on the result of comparing the design image and the operation image via the image analysis processing. More specifically, as an example, the determination section 248 performs image analysis processing to derive the degree of similarity between the images of the comparison range R3 and the comparison range R4, and determines whether or not the connection is "OK", based on whether or not the degree of similarity is a specific threshold value or above. The determination section 248 also performs image analysis processing to derive the degree of similarity between the images of the comparison range R5 and the comparison range R6, and determines whether or not the connection is "OK", based on whether or not the degree of similarity is a specific threshold value or above. Processing transitions to step 330 in cases in which both determinations are affirmative determinations, or processing transitions to step 328 in cases in which at least one of the determinations is a negative determination.

Similarly to at step 122, at step 328, the output section 250 outputs the information indicating that the connection is "BAD" to the HMD 22, and then processing returns to step 314.

However, similarly to at step 124, at step 330, the output section 250 outputs the information indicating that the connection is "OK" to the HMD 22. At the next step 332, the output section 250 updates the connection flag of the design information 32 to "1" for ports for which linking has completed. At the next step 334, the output section 250 determines whether or not the linking operations have completed by determining whether or not the connection flag has become "1" for the all of the ports subject to linkage. Processing returns to step 308 in cases in which the determination is a negative determination, or the operation assistance processing terminates in cases in which the determination is an affirmative determination.

As explained above, according to the present exemplary embodiment, similar advantageous effects to those of the first exemplary embodiment can be exhibited even in cases in which ports are in a multi-level configuration.

Note that in each of the exemplary embodiments above, configuration may be made such that processing is performed to detect the removal of connected cables from ports. A configuration in which a tag or the like indicating an identification number is attached to the end portion of each of the cables, and the identification number of the cable connected to each port of the design information 32 is stored, is an example of such a case.

Figure 26:
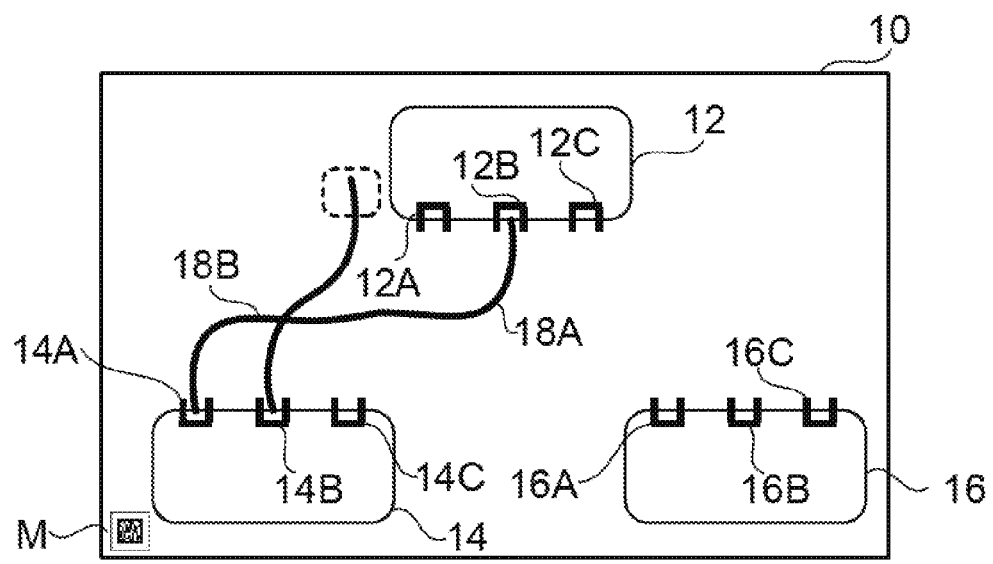
FIG. 26 is a plan view for explaining an example of a case in which a cable has been unplugged from a port.

Then, for video images captured by the camera 28, connected ports are monitored, and the operation assistance processing is suspended in cases in which removal of a cable from a port has been detected. Moreover, information indicating that a portion that includes a tag of a cable (the portion enclosed by the dashed line illustrated in FIG. 26 as an example) has been captured by the camera 28 is displayed on the display section 26. The operator captures the tag of the cable using the camera 28 in accordance with the information displayed on the display section 26. The operation assistance device may be configured to then display, on the display section 26, information stating that the cable that was unplugged from the port is to be reconnected, based on the design information 32 and the identification number indicating the captured tag.

Figure 27:
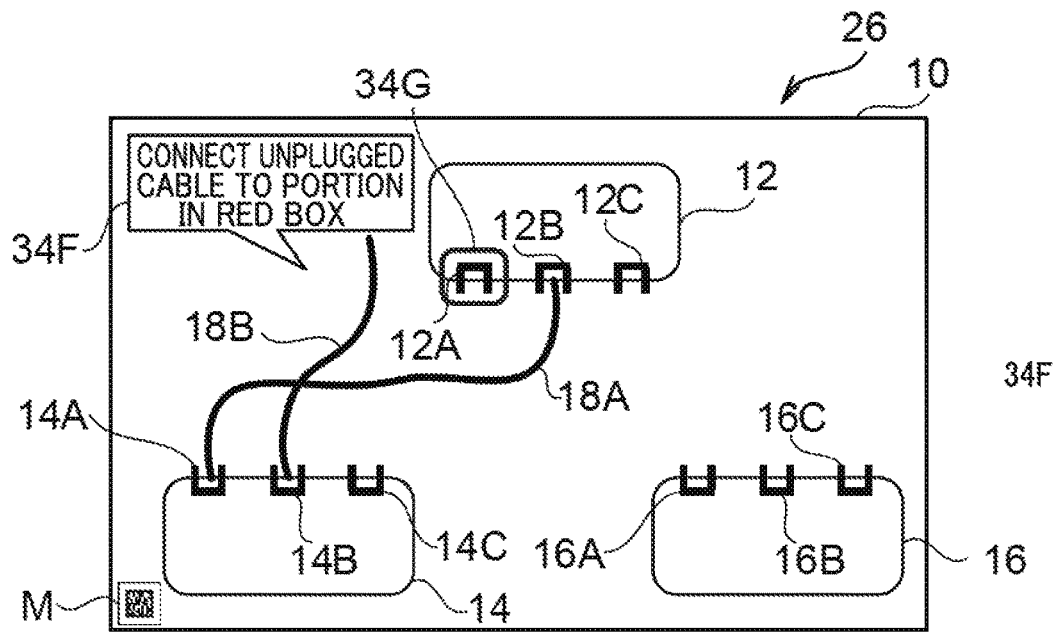
FIG. 27 is a graphic illustrating an example of a reconnection display screen prompting reconnection when a cable has been unplugged from a port.

A reconnection display screen displayed on the display section 26 in this exemplary embodiment is illustrated in FIG. 27. As illustrated in FIG. 27, in this exemplary embodiment, text 34F based on the information stating that the unplugged cable is to be reconnected, and a graphic 34G indicating the connection target port are displayed superimposed on the display section 26.

Figure 28:
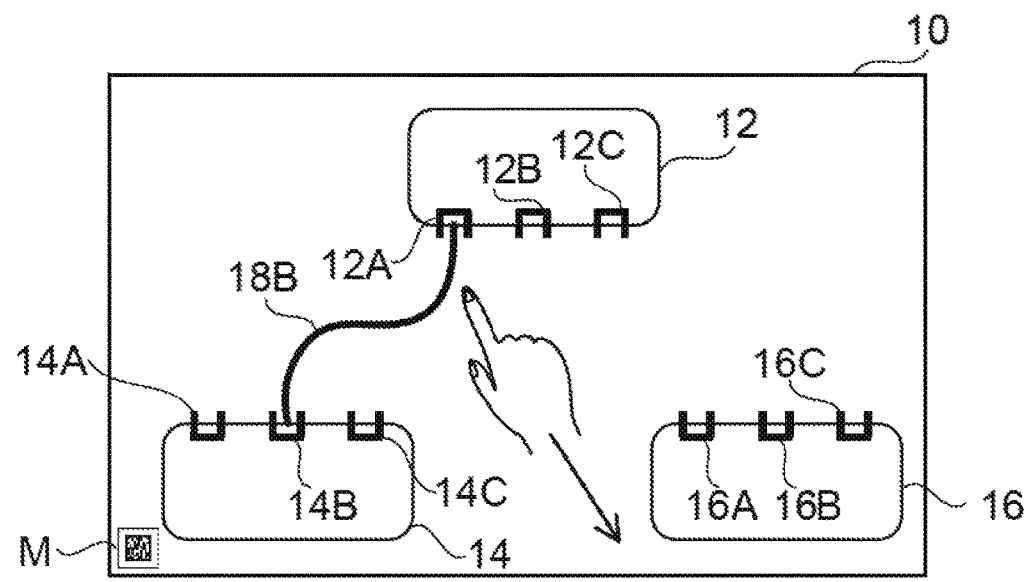
FIG. 28 is a plan view for explaining a modified example of capture timing of an operation image.

In each of the exemplary embodiments above, explanation has been given regarding cases in which still images are captured by the camera 28 according to results of speech recognition on speech input through the input section 24; however, there is no limitation thereto. For example, as illustrated in FIG. 28, configuration may be made such that a still image is captured by the camera 28 at a timing when the hand of the operator has separated from the cable subject to linkage. In such cases, configuration may, for example, be made such that technology to detect objects within an image is used to track the hand region of the operator in video images captured by the camera 28, and the timing at which the hand region of the operator has separated from the cable subject to linkage is detected. Moreover, configuration may, for example, be made such that a still image is captured by the camera 28 when an instruction to capture a still image has been input by the operator through the input/output device 64 of the computer 60 implementing the operation assistance device.

Although explanation has been given regarding cases in which an operation to link a pair of ports is considered a single unit of operation in each of the exemplary embodiments above, there is no limitation thereto. For example, an operation to connect a cable to a single port may be considered a single unit of operation, or an operation to link two pairs or ports may be considered a single unit of operation.

Moreover, in each of the exemplary embodiments above, the camera 28 may be provided fixed at a specific position, and design images may be generated matching the scale of the operation image captured by the camera 28.

Moreover, in each of the exemplary embodiments above, any two out of the HMD 22, the server 30, and the operation assistance device 40 (240) may be implemented by a single device, or all three may be implemented by a single device.

Moreover, although explanation has been given regarding configurations in which the operation assistance program 70, 70A is pre-stored (installed) in the storage section 63 of the in each of the exemplary embodiments above, there is no limitation thereto. The operation assistance program according to technology disclosed herein may be provided in a mode recorded to a recording medium such as a CD-ROM, a DVD-ROM, or USB memory.

Figure 29:
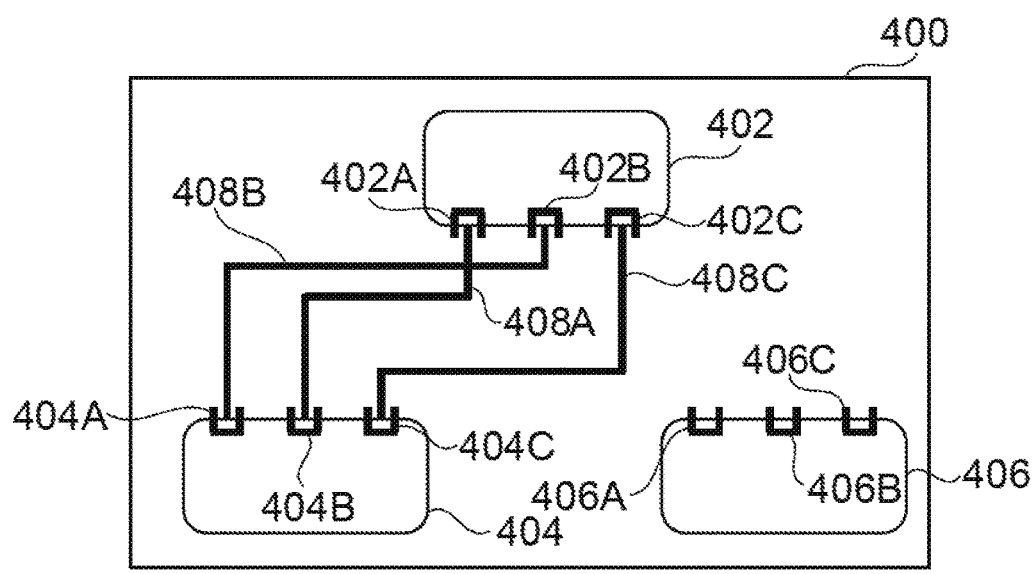
FIG. 29 is a graphic illustrating an example of a design image for explaining conventional technology.

In technology that determines the linkage state of a cable by comparing a design image against a real image captured of the board after the overall wiring operation has completed, sometimes it is not correctly determined whether or not the linkage state of the cables is satisfactory. As an example, explanation follows regarding a case in which the design image is the image illustrated in FIG. 29 and the real image is the image illustrated in FIG. 30. As illustrated in FIG. 29, devices 402, 404, and 406 are mounted on a board 400. Moreover, the devices 402, 404, and 406 are respectively provided with ports 402A to 402C, 404A to 404C, and 406A to 406C, which are cable connection targets. A cable 408A connects to the port 402A and the port 404B, a cable 408B connects to the port 402B and the port 404A, and a cable 408C connects to the port 402C and the port 404C.

Figure 30:
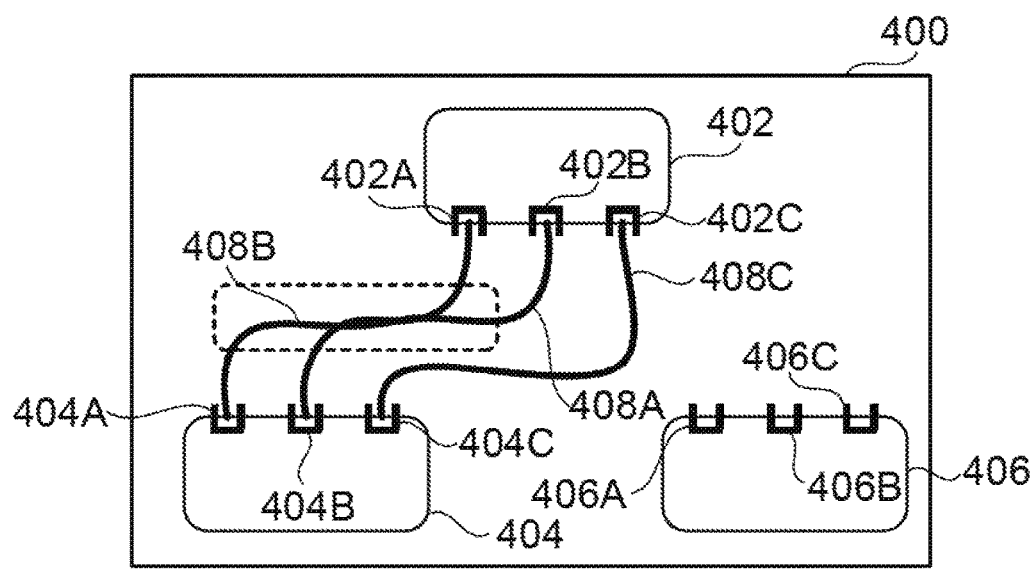
FIG. 30 is a graphic illustrating an example of a real image for explaining conventional technology.

However, in the real image, for example, sometimes the cable 408A and the cable 408B are captured overlapping, as illustrated in the portion enclosed by the dashed line in FIG. 30. In such cases, for example, sometimes the cable 408B is determined to be connected to the port 402A and the port 404A, and an erroneous determination result is produced for the linkage state.

However, in technology in which identification numbers are allocated to connectors of cables and to ports, for example, sometimes the captured identification number is relatively small due to the shape of the connector or port, and there is a possibility that the identification number will not be recognized correctly in such cases, even if the identification number has been captured.

According to one aspect of technology disclosed herein, precision of assisting an operation can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing an operation assistance program that is executable to cause a computer to perform a process, the process comprising:
   acquiring an operation image captured at each unit of operation in a linking operation to link a plurality of devices together;
   identifying positions, in the acquired operation image, of connection portions respectively provided at the plurality of devices, based on marker information included in the operation image, and based on design information of the plurality of devices, the design information including position information and a linkage state of the connection portions;
   executing image analysis processing on the identified positions of the connection portions to determine state of each connections made at each of the units of operation, based on a result of comparing a design image generated based on the design information and the operation image; and
   outputting information indicating a determination result to a display section.

2. The non-transitory recording medium of claim 1, wherein, in the process:
   the design information includes information indicating whether or not the connection portions have already been linked; and
   positions of connection portions other than connection portions already linked together are identified when identifying the positions of the connection portions.

3. The non-transitory recording medium of claim 1, wherein, in the process:
   a sequence of the linking operations is derived based on the design information prior to performing the linking operations; and
   information indicating connection portions subject to linkage at each of the units of operation is output to the display section according to the derived sequence.

4. The non-transitory recording medium of claim 3, wherein, in the process, when deriving the sequence of the linking operations, the sequence is derived based on the design information, such that linking is performed in sequence from connection portions having a shortest distance apart among pairs of connection portions subject to linkage.

5. An operation assistance device comprising:
   a memory; and
   a processor coupled to the memory, the processor being configured to:
      acquire an operation image captured at each unit of operation in a linking operation to link a plurality of devices together;
      identify positions, in the acquired operation image, of connection portions respectively provided at the plurality of devices, based on marker information included in the operation image, and based on design information of the plurality of devices, the design information including position information and a linkage state of the connection portions;

execute image analysis processing on the identified positions of the connection portions to determine state of each connections made at each of the units of operation, based on a result of comparing a design image generated based on the design information and the operation image; and output information indicating a determination result to a display section.

6. The operation assistance device of claim 5, wherein:

the design information includes information indicating whether or not the connection portions have already been linked together; and positions of connection portions other than connection portions already linked together are identified when identifying the positions of the connection portions.

7. The operation assistance device of claim 5, wherein:

a sequence of the linking operations is derived based on the design information prior to performing the linking operations; and information indicating connection portions subject to linkage at each of the units of operation is output to the display section according to the derived sequence.

8. The operation assistance device of claim 7, wherein, when deriving the sequence of the linking operations, the sequence is derived based on the design information, such that linking is performed in sequence from connection portions having a shortest distance apart among pairs of connection portions subject to linkage.

9. An operation assistance method comprising:

acquiring an operation image captured at each unit of operation in a linking operation to link a plurality of devices together;

identifying positions, in the acquired operation image, of connection portions respectively provided at the plurality of devices, based on marker information included in the operation image, and based on design information of the plurality of devices, the design information including position information and a linkage state of the connection portions;

by a processor, executing image analysis processing on the identified positions of the connection portions to determine state of each connections made at each of the units of operation, based on a result of comparing a design image generated based on the design information and the operation image; and outputting information indicating a determination result to a display section.

10. The operation assistance method of claim 9, wherein:

the design information includes information indicating whether or not the connection portions have already been linked together; and positions of connection portions other than connection portions already linked together are identified when identifying the positions of the connection portions.

11. The operation assistance method of claim 9, wherein:

a sequence of the linking operations is derived based on the design information prior to performing the linking operations; and information indicating connection portions subject to linkage at each of the units of operation is output to the display section according to the derived sequence.

12. The operation assistance method of claim 11, wherein, when deriving the sequence of the linking operations, the sequence is derived based on the design information, such that linking is performed in sequence from connection portions having a shortest distance apart among pairs of connection portions subject to linkage.

* * * * *